United States Patent [19]

Wong et al.

[11] 3,750,137

[45] July 31, 1973

[54] ELECTRONIC CONFERENCE MONITORING SYSTEM

[76] Inventors: Alfred Y. Wong, 1017 Westholm, Los Angeles, Calif.; James M. Nuding, 20415 Baltar St., Canoga Park, Calif. 91306; Zalton J. Lucky, 1287 Indianapolis, Los Angeles, Calif. 90066

[22] Filed: Sept. 2, 1971

[21] Appl. No.: 177,387

[52] U.S. Cl. .................................. 340/330, 340/336

[51] Int. Cl. .................................. G08b 5/00

[58] Field of Search ................ 340/330, 213 Q, 336, 340/324 R, 378 R

[56] References Cited

UNITED STATES PATENTS

| | | | |
|---|---|---|---|
| 1,713,276 | 5/1929 | Goeckler | 340/213 Q |
| 3,603,968 | 9/1971 | Johnson | 340/336 |
| 3,641,321 | 2/1972 | Tonne | 340/330 |
| 2,883,255 | 4/1959 | Anderson | 340/213 Q |

*Primary Examiner*—John W. Caldwell
*Assistant Examiner*—Marshall M. Curtis
*Attorney*—Spensley, Horn and Lubitz

[57] ABSTRACT

An electronic meeting monitoring system for monitoring and displaying information regarding the progress of meetings in a number of meeting rooms. The system is comprised of a slave unit for each conference room and a master unit for placement in a central area such as a lobby. Each slave unit and the master unit is adapted to identify the conference going on in each conference room by conference number and to indicate the approximate length of time each of the conferences has been in session. When a new conference starts in any of the conference rooms, the speaker pushes a button which advances the numeral indicating the conference number currently in session in that room by one digit and, further, resets the time indication for that room, on the master unit and all slave units. The signals transmitted between the master unit and the slave units are generally multiplexed and periodically updated to minimize the cabling between units and to minimize the effects of electrical transients introduced in the system. A color coding system is used to identify the various conference rooms by predetermined color for ease of association of data with the corresponding room.

11 Claims, 4 Drawing Figures

PATENTED JUL 31 1973 3,750,137

SHEET 1 OF 2

ALFRED Y. WONG
JAMES M. NUDING
ZALTON J. LUCKY
INVENTORS

BY Spensley, Horn & Lubitz
ATTORNEYS

ALFRED Y. WONG
JAMES M. NUDING
ZALTON J. LUCKY
INVENTORS

BY Spensley, Horn & Lubitz
ATTORNEYS

ELECTRONIC CONFERENCE MONITORING SYSTEM

BACKGROUND OF THE INVENTION

1. Field of the Invention

This invention relates to the field of monitoring and display systems.

2. Prior Art

At most conventions, such as technical conventions, medical conventions, etc., it is common to have a number of conferences going on simultaneously in a number of different conference rooms at the convention center. These conferences may consist of talks given by various speakers, perhaps summarizing the work they have done in a particular field or summarizing a paper they have written, or may consist of discussion groups for discussing particular subjects of interest at the conference. Because of the number of conferences normally held at a convention, the limited amount of time available for the convention, and the fact that most people attending a convention only desire to attend a limited number of the conferences presented, it is generally necessary and desirable to hold a number of conferences simultaneously.

In the prior art, no apparatus is known or commonly used for monitoring the progress of the various conferences in any practical manner. Similarly, no apparatus is known for displaying the information concerning the progress of the various conferences at various convenient points around the convention center such as, for instance, in the various conference rooms themselves and in the lobby of the convention center. Instead, the usual approach is to simply schedule a number of conferences to start at predetermined times throughout the convention. A schedule of the conferences to be held in the various conference rooms, with the associated starting times for each conference, is published before the convention so that the people planning to attend the convention may predetermine those conferences which they wish to attend and schedule their activities accordingly. Thus, theoretically, no monitoring and display system is required if the published schedule is rigorously followed. However, experience has shown that such schedules are rarely followed, and considerable confusion and interruption of the conferences generally exists because of the lack of information regarding such things as the actual progress of the conferences and even which conference is in session at any one time in any conference room.

If the people conducting each of the conferences would rigidly adhere to the schedule and the alloted time period, the published schedule would generally be adequate to allow a person to attend each conference that he desired to attend without difficulty. However, it is common for various of the conferences to start late and/or for the person conducting the conference to run considerably overtime, either in the presentation of his material or in the answering of questions and the discussions following his formal presentation. This, of course, is to be expected since the people generally conducting the individual conferences are not people with considerable experience in that activity (e.g., lecturing on a subject for a fixed time duration), but instead are people who have done something or achieved something in the particular field of interest at the conference in which others expected to attend the conference would be interested in learning about. This, plus the fact that the speaker is deeply knowledgable and interested in the subject of the conference he is conducting and does not wish to present less than a full discussion and to answer all questions thereafter, generally makes the starting time of the conference considerably different than that expected from the published schedule, and often results in a conference overrunning the alloted time by a considerable margin. Thus, it is clear that a published schedule is at best only a rough guide for a person attending a convention.

The net result of not having a good monitoring and display system for use at such conventions is considerable confusion on the part of the attendees and frequent interruptions in the various conferences. By way of example, without a monitoring system there is very little incentive on the part of the people conducting the individual conferences to limit their time to that alloted for their presentation. Thus, a conference often extends beyond the scheduled starting time for the next group of conferences. Consequently, people often interrupt one conference by leaving the conference before it is over in order to attend the next conference in another conference room only to find upon entering the next conference room that they are not arriving at the beginning of the conference they want to attend but instead are interrupting the end of the last conference held in that conference room. This further delays the various conferences and substantially detracts from the organization and value of the various presentations. Similarly, a person waiting in the lobby of the convention center for one of the later conferences in the day to start has no way of knowing how late the various conferences are running in that room, so that he, likewise, is very apt to interrupt a previous conference if he enters the room at the scheduled conference time.

Thus, it is clear that a system is needed which will, first, provide an indication readily visible to the person conducting each individual conference for budgeting his time as he presents his material, and secondly, provide an indication to the attendees at all conferences, and also to the people waiting in the lobby, the progress of each and every conference so that the attendees may reach the conferences of their choice at the beginning of the conferences without unnecessary interruption of other conferences, and further, which can be used in conjunction with simple direction indicators to aid the attendees in finding the proper rooms.

BRIEF SUMMARY OF THE INVENTION

An electronic meeting monitoring system for monitoring and displaying information regarding the progress of meetings in a number of rooms. The system is comprised of a slave unit for each conference room and a master unit for placement in an area such as a lobby. The slave display units and the master display unit each have a plurality of colored translucent panels on the front thereof with light bars attached thereto for illumination in various combinations to display characters ranging from 0 to 19, for identification of the conference number in session in the corresponding conference room, and for displaying information regarding the time that has elapsed from the beginning of that conference. The conference rooms are color coded in colors corresponding to the translucent panels on the master and slave display units, so that the display of information, by way of example, on the red translucent panel on the master and slave display units, is immediately identified as indicating the status of the conference in the conference room previously coded as the red room.

When a conference starts in any of the conference rooms, the person conducting the conference pushes a button providing a switch closure signal which is transmitted to the master display unit. The circuitry therein counts the total number of switch closure signals for each conference room and creates character information signals for displaying numerals ranging from 0 to 19 on the master display unit, and further multiplexes the information for transmission to, decoding in, and displaying on, each slave display unit. Also, each switch closure resets a timing circuit for that conference room which, after pre-determined periods of time, will sequentially illuminate four timing light bars on each of the display units, thereby indicating the time remaining for the conference number displayed for that conference room. The multiplexing of the display information for transmission between the master display unit and the slave display units grossly reduces the number of wires required in the interconnecting cables, resulting in a system which may be readily set up at a convention center without substantially obstructed hallways, etc., with cable. Of course, the disclosed system may also be used with radio links or wall plug connections between the various units; the multiplexing methods disclosed grossly reducing the complexity of the communication system over that that would otherwise be required.

DETAILED DESCRIPTION OF THE INVENTION

Figures 1, 2:
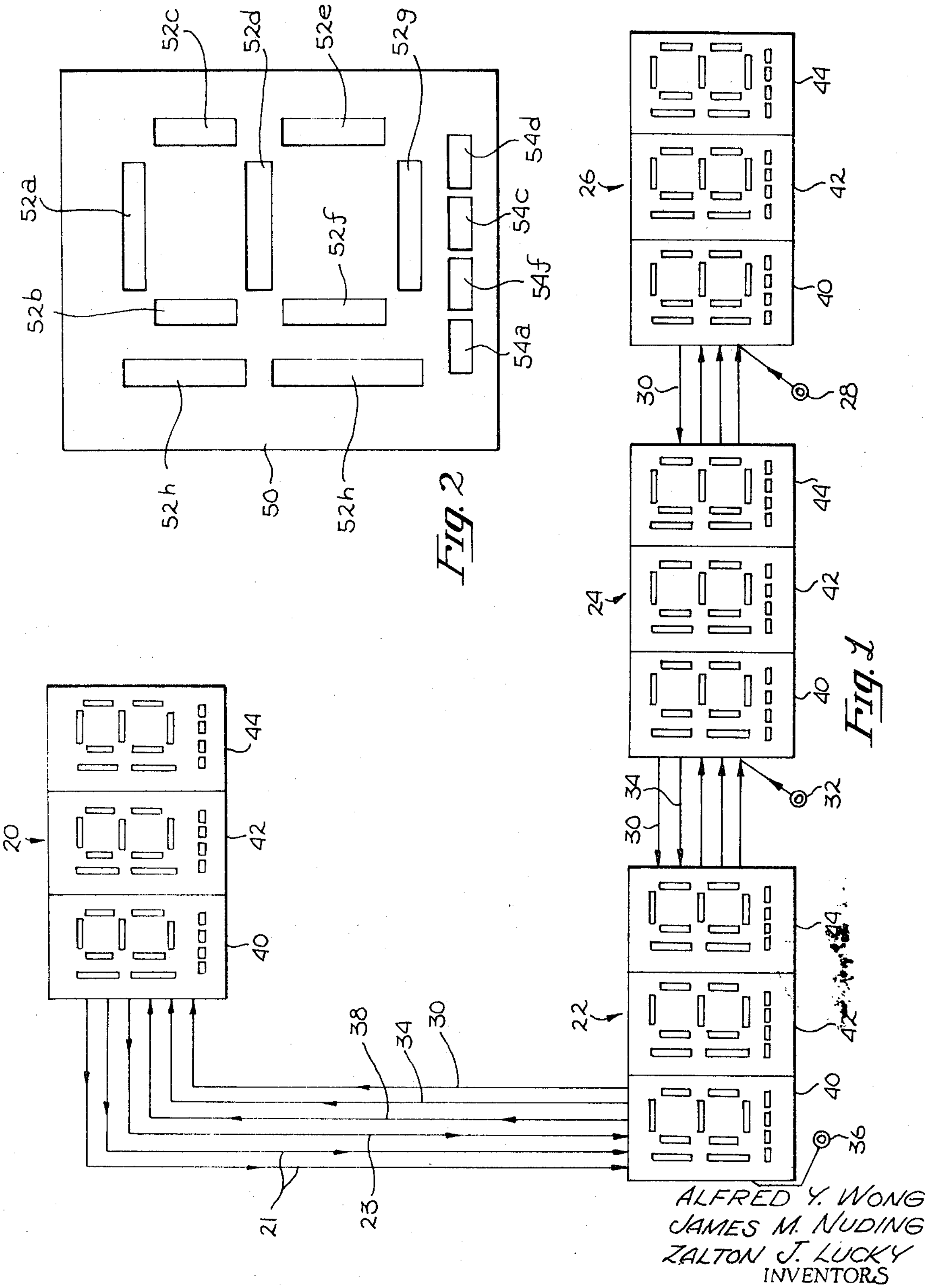
FIG. 1 is a schematic representation of the system of the present invention.
FIG. 2 is a schematic representation of the light bars in each panel of the master display unit and of the slave display units in the system of FIG. 1.

First referring to FIG. 1, a block diagram of the system of the present invention may be seen. The system is comprised of a master display unit 20 and a plurality of slave display units 22, 24 and 26. Each slave display unit has a pushbutton switch associated therewith which is connected in circuit with the master display unit 20. Thus, pushbutton switch 28 is connected to the master display unit 20 through line 30. Similarly, pushbutton switch 32 associated with slave display unit 24 is connected to the master display unit 20 through line 34 and pushbutton switch 36 associated with slave display unit 22 is connected to the master display unit 20 through line 38. Also connected between the master display unit and the slave display units are two data transmission lines 21 and a clock pulse train data transmission line 23.

The master display unit 20 and each of the slave display units 22, 24 and 26 have a plurality of panels 40, 42 and 44 aligned in side-by-side relationship on the front of the units so as to present information regarding the status of the meetings in the various meeting rooms, the number of such panels on each unit, in general, being equal to the number of slave units attached to the master display unit (three slave units and three panels being used in the system shown in FIG. 1).

A typical panel, as used for panels 40, 42 and 44 in both the master display unit and the slave display units, is shown in FIG. 2. Each of the panels is comprised of a colored translucent panel 50 with a plurality of light bars attached to the back thereof. The light bars are formed by an opaque plastic enclosure with an open rectangular surface attached to the translucent panel and having an incandescent light bulb therein, which, when connected to a source of electrical power, illuminates a corresponding area of the translucent panel through the open face of the opaque enclosure. The light bars *52a* through *52g* are arranged in a figure 8 pattern and may be illuminated in various combinations so as to represent the digits 0 through 9. Such digit or character representation is commonly referred to as a seven segment character, and is wellknown in the prior art of digital displays. The two light bars *52h* are wired together and lighted in unison upon a proper command. When lighted, these bars indicate a one, thereby giving a numeral range of 0 through 19. As shall be subsequently described in greater detail, the numeral represented by the illumination of various of the light bars represents the number assigned to the conference in session in the associated conference room.

The light bars *54a* through *54d* are used to display the progress of the particular conference. Thus, light bar *54a* is lighted when 25% of the scheduled conference time has elapsed, light bar *54b* is lighted when 50% of the scheduled conference time has elapsed, etc., until all four of the light bars are illuminated, thereby indicating the end of the time allotted for that individual conference. The slave display units are, in general, located at positions within the conference rooms so as to be viewable both by the attendees of the conference and by the person conducting the conference so that the slave display unit will inform the attendees of the status of conferences in other conference rooms and will inform the person conducting the specific conference of the time remaining within which he should conclude his presentation.

It has been found that the prior art method of identifying and giving directions to the various conference rooms by identifying the name or the number of the room is not very satisfactory, since the attendees at most conferences are not familiar with the building within which the conference is being held, and signs placed within the building indicating the directions to the various rooms by number or by name are often confusing and not easily read. Consequently, a method of identifying the various conference rooms which avoids these difficulties has been used in conjunction with the preferred embodiment of the present invention. This method is to identify the various conference rooms not by number or name but rather by color, assigning a specific distinctive color to each of the individual conference rooms. Thus, attendees are easily directed to the room of their choice by pre-placed colored arrows located at various points within the halls of the building and on the doors of the individual conference rooms. The master schedule sent to the attendees before the conference is held identifies the location of the various conferences simply by the color code for the room in which the conference is to be held. The colored translucent panels 50 have colors corresponding to the colors assigned to the various conference rooms. By way of example, in the preferred embodiment, the translucent panels for the indicating panels 40 in FIG. 1 are red in color and thus used to indicate the conference number and progress thereof for the "red" room. The colored translucent panels for indicating panels 42 are green and display information regarding the status of the green conference room, etc. Thus, without additional numbers, names, etc. attendees may quickly and accurately determine the status of conferences in any of the conference rooms at a glance with little chance of confusion or misunderstanding of the information being displayed.

It has been found convenient and useful to also provide a color coded card with the master schedule so that the attendees may mark the card prior to the conference in a manner indicating the meetings they desire to attend by meeting number and conference room color. The attendees subsequently use the card as a guide and reminder at the time of the conference and no longer need the larger and less convenient master schedule. By collecting these cards at the end of the conference, a convenient record of attendance at, or at least interest in the various meetings, is obtained and such data may be compiled to aid in the planning of subsequent conferences.

Referring again to FIG. 1, there is associated with each slave display unit a pushbutton switch. This switch is used by the person conducting the conference in a particular conference room to advance the numeral indicating the number of the conference being held in that room by one digit, and to reset and start the timing system which will periodically and sequentially illuminate the light bars *54a* through *54d*. In this regard, it should be noted that the various slave display units have a substantially identical outward appearance. They are, in fact, electrically different in that the various pushbuttons 28, 32 and 36 each are connected so as to control indicating panels of different colors and, therefore, are each to be associated with the conference room corresponding to the particular color display controlled by the pushbutton switch. By way of example, pushbutton switch 36 may control indicating panels 40 which have a red translucent panel 50 and, therefore, slave display unit 22 is specifically adapted for use in the red room. Similarly, pushbutton switch 32 may control the green indicating panels 42 and, therefore, the slave display unit 24 is specifically adapted for use in the green room, etc.

Having now described the physical appearance and effect of the actuation devices (e.g., the pushbutton switches associated with the slave display units), the method of use of the apparatus of the present invention may now be described. At the start of a convention, such as a technical convention, or alternatively at fixed periods throughout the convention such as each morning before any of the conference meetings begin, all of the units will be reset to display zeros in each display panel. When the first conference meeting begins, the person conducting the meeting pushes the pushbutton switch associated with the slave display unit in that meeting room. This advances the numeral displayed for that room from 0 to 1 and initiates the timing device which will sequentially periodically illuminate the light bars *54a* through *54d*. When the time allotted for that meeting has elapsed, the four light bars *54a* through *54d* will all be lighted, thereby indicating to both the attendees and the person conducting the meeting that the allotted time has elapsed. Though the person conducting the meeting may still proceed to over-run the allotted time, the visual display of such fact to both the person conducting the meeting and the attendees provides strong encouragement to the person conducting the meeting to further over-run the alloted time only if absolutely necessary. When the next meeting begins, the person conducting that meeting similarly first pushes the pushbutton switch which again advances the digit displayed by one digit and resets the timing device. The conference number and the elapsed time are, of course, displayed in the color coded fashion in all conference rooms and in a central area, such as the lobby of the building, so as to inform not only the attendees of the specific conference but the attendees of all other meetings and those awaiting meetings they desire to attend.

It may be seen from FIG. 2 that each panel in each slave display unit and in the master display unit has 12 individually operating light bars. Though only three panels are shown for each of the display units in FIG. 1, typical display units, in general, have six to eight such panels therein. consequently, for such display units, the total number of light bar signals per display unit will be 72 to 96 signals. Thus, if the light bar signals are generated at one location, by way of example, in the master display unit 20, and then transferred directly by cable to each of the slave display units, inordinately large cables between the various units of the present invention would be required. Since these cables, in general, must be placed along halls, across doorways, etc., and are relatively long cables, such large cables are, in general, easily damaged, expensive, unsightly and present a significant safety hazzard by causing people to trip over them. Consequently, in the preferred embodiment, the signals for illuminating the various light bars are generated in the master control unit and are multiplexed before transmission to the various slave display units so as to substantially reduce the number of wires required in the interconnecting cables.

Figures 3, 4:
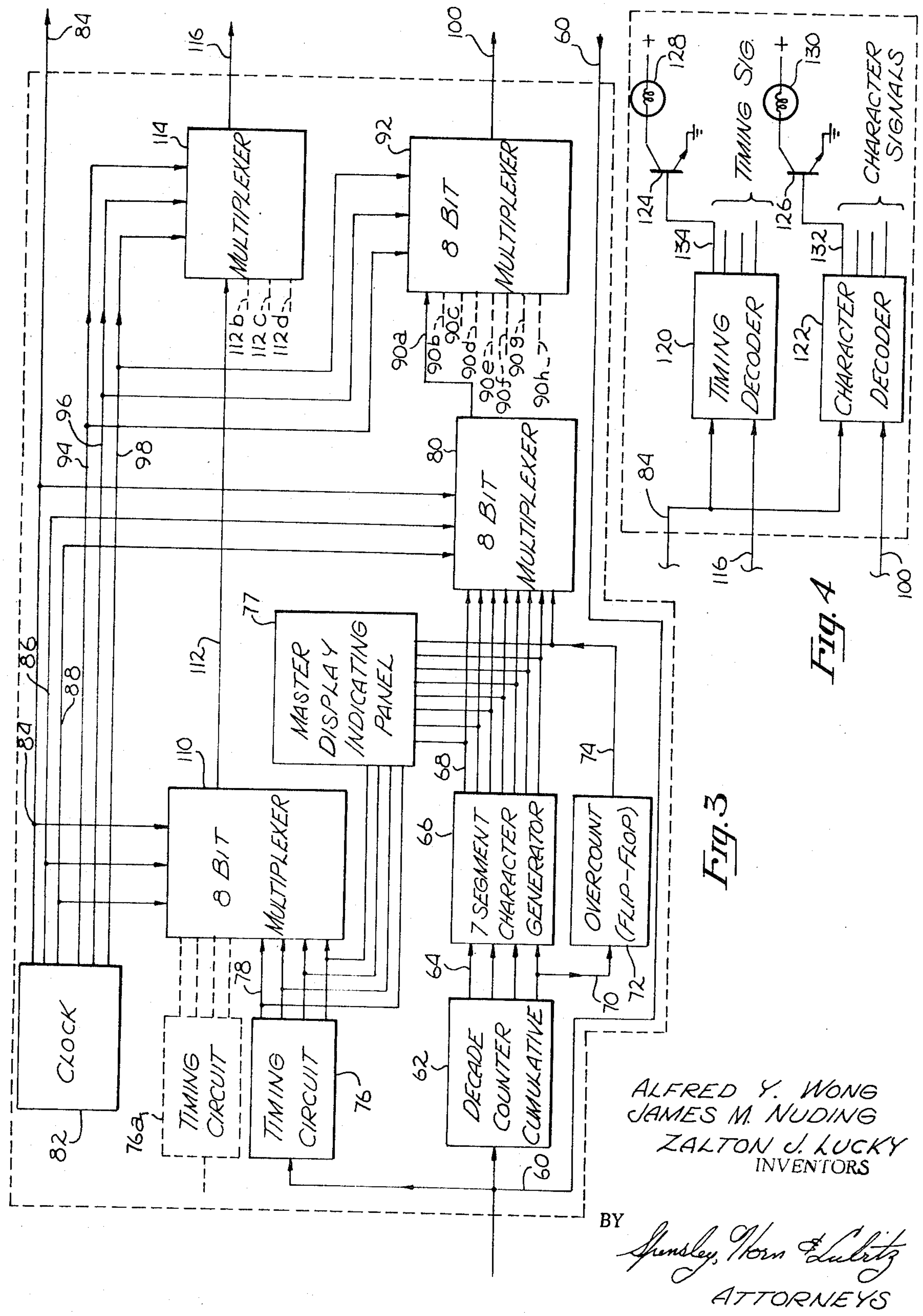
FIG. 3 is a block diagram of part of the electronic system in the master display unit.
FIG. 4 is a block diagram of the decoding system in each of the slave display units.

Now referring to FIGS. 3 and 4, block diagrams of the electronic circuitry used in the system of the present invention may be seen. FIG. 3 presents a block diagram of the circuitry within the master display unit 20 for controlling one indicator panel on the master display unit and for multiplexing the display signals for transmission to the slave control units. Shown in phantom in this figure are the various inputs for the other display panels, the system shown being adapted for use with eight slave display units in different conference rooms and, accordingly, for displaying the status of the meetings in the eight rooms on all eight slave display units and on the master display unit.

When a meeting in the conference room controlled by the circuit shown in FIG. 3 is about to start, the person conducting the meeting momentarily pushes the pushbutton connected to the slave display unit in that room. This provides a switch closure signal, the only signal input to the circuit of FIG. 3, on line 60. The switch closure signal is applied to decade counter 62 which provides a four bit output signal on lines 64 indicating in binary form the cumulative number of switch closing from 0 to 9. This signal is applied to a seven segment character generator 66 which provides seven output signals on lines 68 which, when properly amplified and applied to the various light bars *52a* through *52g*, will light the proper segments to display a numeral corresponding to the total count of the decade counter.

When the decade counter 62 is at a count of 9 and an additional switch closure signal is received, the decade counter changes back to a 0 count. This is sensed through line 70 connected to one of lines 64 by an overcount flip-flop 72, which provides a single binary output on line 74 for control of the light bars 52*h* (FIG. 2) thus providing a 1 in front of the digits created by the seven segment character generator 66.

The signals on lines 68 and on line 74 are applied directly to the display panel segments for the corresponding room on the master display indicating panel 76. Thus, on repeated switch closings, the master display indicating panel will count consecutively 0 through 19, and upon the next switch closing will return to 0 again. The switch closing signal appearing on line 60 is also applied to a timing circuit 76. This timing circuit is adapted to be reset to 0 upon receiving a switch closing signal and to provide signals appearing on lines 78 indicative of the elapse of 25%, 50%, 75% and 100% of a pre-set (adjustable) time period. These signals appearing on lines 78 are also applied directly to the light bars 54*a* through 54*d* on the master display indicating panel 76 for displaying the elapsed time from the start of the meeting.

As previously indicated, the various signals on lines 78, 68 and 74 could be applied to the various slave display units through cables, but such cables are, in general, too large and easily damaged to be practical. Consequently, these various signals are multiplexed for transmission on a lesser number of lines, thereby substantially reducing the number of wires required in the cables interconnecting the display units. The seven segment character signals appearing on lines 68 and the 0 – 1 signal appearing on line 74 are connected to an eight bit multiplexer 80 which receives clock signals from clock 82 through lines 84, 86 and 88, and converts the eight bit parallel input signal to a serial output signal on line 90*a*. This serial output signal is applied to another eight bit master multiplexer 92, as are the serial output signals for the other seven display panels through lines 90*b* through 90*h*. The eight bit master multiplexer 92 receives clock signals from the clock 82 on lines 94, 96 and 98 and converts the parallel inputs on lines 90a through 90*h*, each representing in serial form the characters to be displayed, into a serial output appearing on line 100.

The clock 82 provides periodic clock signals on lines 84, 86, 88, 94, 96 and 98 which represent a six bit binary number equivalent to 0 through 63, with the signals on lines 84, 86 and 88 representing the three least significant binary members. Thus, on the first count, the eight bit multiplexer 80 provides an output on line 90*a* corresponding to the input signal on the first of lines 68. Similarly, the eight bit multiplexer 92 provides an output on line 100 which is equal to the signal applied on line 90*a* and, thus, is the signal on the first of lines 68. On the second count, the eight bit multiplexer 80 provides an output on line 90a corresponding to the signal on the second of lines 68, on the third count an output signal corresponding to the signal on the third of lines 68, etc. On the eighth count, the signal appearing on line 74 will appear as the output on line 100. On the ninth count, the clock signals on lines 84, 86 and 88 return to the 0 state with a carryover appearing on line 94. Thus, the eight bit multiplexer 92 is advanced to provide an output on line 100 equal to the input on line 90*b* and will remain in this condition until the clock 82 has directed another eight bit multiplexer, not shown, (equivalent to eight bit multiplexer 80 but providing a signal representing the character information for the meeting number in the next conference room) to cycle through the character information representing the data for that room. Thus, the output signal on line 100 is a digital signal representing in serial form the light bar signals for the eight display panels on each of the eight slave display units.

The timing signals on lines 78, in addition to being applied directly to the light bars 54*a* through 54*d* on the master display indicating panel 76, are applied to multiplexer 110. This multiplexer may be a four bit multiplexer or, ashown in FIG. 3, may be an eight bit multiplexer adapted to multiplex both the timing circuit signals from timing circuit 76 and from timing circuit 76*a* representing the timing signals for a different conference room. Thus, the signal appearing on line 112 for the embodiment shown in FIG. 3, is a serial signal representing the timing signal information for two conference rooms. This signal, along with signals on lines 112*b* through 112*d*, each of which are similar multiplex signals representing the timing signals for two additional conference rooms, are applied to multiplexer 114. This multiplexer receives clock signals from clock 82 on lines 94, 96 and 98, and multiplexes these four signals to create an output on line 116 representing, in serial form, the timing signal information for all eight conference rooms.

Now referring to FIG. 4, a block diagram of the electronic circuitry in each of the slave display units for decoding the multiplexed light bar signals and for providing as an output a plurality of signals for turning on the light bars in the appropriate pattern may be seen. This electronics is comprised of a timing decoder 120, a character decoder 122, and a plurality of transistors 124 and 126, each connected in series with incandescent lamps 128 and 130, respectively, located in light bars 54*a* through 54*d* and 52*a* through 52*h*, respectively. The clock 82 (FIG. 3) is adapted to provide a train of 64 pulses on line 84 at periodic intervals. In the preferred embodiment, the pulse width is approximately 10 microseconds and the pulse train is repeated every one second. The character decoder 122 simultaneously receives the multiplexed character information on line 100 and the clock pulse train on line 84, and uses the clock pulse train as a reference to change the serial character information on line 100 to parallel character information on lines 132. Lines 130 (there are 64 such lines for an eight display panel slave unit) are each connected to the base of a transistor 126, the emitter of which is connected to ground, and the collector of which is coupled through an incandescent light 130 in one of the light bars on the panel to a source of electrical power. The transistor acts as a switch, turning the light off when the voltage on the base is low and turning the incandescent light on when the voltage on the base is high (on the order of a few volts). Thus, the binary signals on lines 130 control the transistors 126 so as to illuminate the various light bars on the various panels in a manner controlled by, and duplicating the information displayed by, the master display unit. In a similar manner, the timing decoder 120 decodes the multiplexed timing signal on line 116, converting the serial input on line 116 to a parallel output on lines 134. As before, the signal appearing on lines 134 is applied to the base of transistor 124 for switching control of the incandescent lights 128 in the timing light bars on the eight display panels.

The character information for displaying on eight panels (corresponding to eight individual conference rooms) requires a 64 bit binary signal, since there are eight light bars per panel, whereas the timing signals require only a 32 bit signal since there are only 32 light bars on eight panels. Thus, the multiplexing and the decoding system for the timing signals need only be a 32 bit multiplexing and decoding system, and may, as an alternative, be adapted to operate from the 32 bit clock pulse train, rather than from the 64 bit clock pulse train on line 84. Similarly, if desired, the signal on line 116 may be further multiplexed with the signal on line 100 for transmission to the slave display units on a single wire, rather than on the two lines shown in FIGS. 3 and 4. In such a case, a single decoder adapted to operate on a clock pulse train of 96 pulses would be used in place of the decoders shown in FIG. 4. However, this additional multiplexing and decoding is generally not required since the system of the preferred embodiment reduces the wires in the cabling to a readily manageable number.

As shown in FIG. 1, the slave display units in the preferred embodiment are connected in series with the first of the series connections connected to the master display unit. Thus, there is one switch closing signal line for each slave display unit running between the first slave display unit and the master display unit, and two data transmission lines and a clock pulse train transmission line running between the first slave display unit and the master display unit. The number of wires running between slave display units reduces by one for each slave display unit in the series connection so that the cable running to the last slave display unit has therein only one switch closing signal transmission line, two data transmission lines and a clock pulse train transmission line. Of course, a parallel connection for the slave display units to the master display units may also be utilized as an alternate to the series connection illustrated in FIG. 1. However, it has been found that the net cabling required in disposing the slave display units in the desired locations for most buildings is reduced by using the series connection of the preferred embodiment.

As previously mentioned, in the preferred embodiment, the clock pulse signals are approximately 10 microseconds in duration. Consequently, a pulse train of 64 clock pulses consumes a time period on the order of 1 millisecond and the pulse train is repeated every one second. Thus, the information displayed is updated every one second, and in the event noise or fictitious signals result in an improper signal being received at any of the slave display units, that erroneous information will be displayed only for approximately one second before being corrected by an updating signal. Also, since the updating time is only approximately one millisecond and incandescent light bulbs, in comparison, are slow to respond to short term voltage interruptions, there is no visible winking or flickering of the displayed information while being updated.

Thus, there has been described an electronic meeting monitoring system for monitoring and displaying information regarding the progress of meetings in a number of meeting rooms which is effective both to inform persons within and without the various conference rooms of the status of all meetings in all conference rooms and to provide a visual incentive for persons conducting the conferences to adhere to the allotted time for the presentations. Though the invention has been specifically described with respect to an embodiment which uses a system of cables for interconnecting the various units, it is to be understood that other communication devices and systems may be used to couple the units, such as, by way of example, radio links, fixed special wiring in the building, or transmission over the main 60 CPS 115 Volt power lines in the building, the disclosed multiplexer, and variations thereof greatly simplifying the complexity of the coupling system over that that otherwise would be required. Thus, while the invention has been particularly shown and described with reference to a preferred embodiment thereof, it will be understood by those skilled in the art that various changes in form and details may be made therein without departing from the spirit and scope of the invention, and that the same principle of electronically displaying numerals and characters can be used in other devices, such as, by way of example, teaching devices and the like which may require large visual displays.

We claim:

1. A conference monitoring system for monitoring and displaying information at a plurality of locations regarding the status of a plurality of conferences comprised of: a master display unit having a plurality of different colored display panels thereon, and a plurality of slave display units equal in number to said plurality of display panels on said master display unit, each of said slave display units having a plurality of colored display panels thereon equal in number to the number of said display panels on said master display unit and each having the same color as respective ones of said display panels on said master display unit, means for providing a start signal associated with each of said slave display units, said last named means being coupled to said master display unit, each of said display panels having means for displaying a character and a means for indicating the passage of a plurality of time intervals, said master display unit having a means coupled to said start means for counting start signals provided by each means for providing start signals, said means for counting being coupled to said display panels so as to display on all of said display panels having the same color a number indicative of the cumulative number of start signals for that one of said means for providing a start start signal, said master display unit further having timing means coupled to each means for providing a start signal and to said display panels, said timing means being a means for determining the passage of a plurality of pre-set time intervals from start signals provided by each said start means and for causing said display means to display for each of said start means an indication of the passage of each of said plurality of time intervals on said display panels adjacent said character indicative of the count of said start signals from that one of said start means.

2. The monitoring system of claim 1 wherein said means for displaying a character is comprised of a series of illuminable segments arranged to form a seven segment character preceded by the digit one.

3. The monitoring system of claim 2 wherein said means for counting is coupled to said display panels on said slave display units through a multiplexer in said master display unit and a decoder in each of said slave display units.

4. The monitoring system of claim 3 wherein said multiplexer combines the output signals for said means for counting so as to create a periodic pulse train representative of, in serial digital form, the signals for illuminating said segments in each of said display panels on each of said slave display units in appropriate combinations to display characters on said panels indicative of the cumulative number of start signals for the respective ones of said means for providing a start signal.

5. The monitoring system of claim 4 wherein said pulse train is periodically repeated.

6. The monitoring system of claim 4 wherein said means for indicating the passage of a plurality of time intervals comprises a plurality of illuminable areas on each said display panel, said timing means also being coupled to said display panels on said slave display units through a multiplexer in said master display unit and a decoder in each said slave display unit.

7. The monitoring system of claim 6 wherein the last named said multiplexer combines the output signals for said timing means so as to create a pulse train representative of, in serial digital form, the signals for illuminating said illuminable areas on each of said display panels in appropriate combinations to indicate the passage of said time intervals from the last start signal for the respective ones of said means for providing a start signal.

8. The monitoring system of claim 1 wherein said start means comprises a pushbutton switch associated with each of said slave display units.

9. The monitoring system of claim 1 further comprised of a color coded means for indicating location of various events wherein said means are adapted to include indica for compiling data regarding the attendance at said events.

10. The monitoring system of claim 1 further comprised of a color coded means for indicating location of various events wherein said color coded means is a color coded card having said colors keyed to the colors of said display panels.

11. A conference monitoring system for monitoring and displaying information at a plurality of locations regarding the status of a plurality of conferences comprised of: a master display unit having a plurality of display panels thereon, and a plurality of slave display units equal in number to said plurality of display panels on said master display unit, each of said slave display units having a plurality of display panels thereon equal in number to the number of said display panels on said master display unit, a switch for providing a start signal associated with each of said slave display units, each said switch being electrically coupled to said master display unit, each of said display panels having at least one seven segment character for displaying a number, and a plurality of illuminable devices for indicating the passage of a plurality of time intervals, said master display unit having a multiplexing means electrically coupled to each of said slave display units, through a cable, said master display unit further having a means coupled to said start means for counting start signals provided by each said switch, said means for counting being coupled to said display panels on said master display unit and to said multiplexing means so as to display on one of said display panels on each slave display unit and on said master display unit a number indicative of the cumulative number of start signals for the one said switch associated with the respective display panels, said master display unit further having timing means coupled to each said switch and to said display panels on said master display unit and to said multiplexer, said timing means being a means for determining the passage of a plurality of pre-set time intervals from start signals provided by each said switch and for causing said display panels associated with each said switch to display by said illuminable devices an indication of the passage of each of said plurality of time intervals on said display panels adjacent said character indicative of the count of said start signals from that one of said switches.

* * * * *